(12) United States Patent
Bell et al.

(10) Patent No.: US 11,014,676 B2
(45) Date of Patent: May 25, 2021

(54) LIGHTWEIGHT AIRCRAFT PASSENGER SEAT ASSEMBLY

(71) Applicant: Mirus Aircraft Seating Ltd., Norfolk (GB)

(72) Inventors: Duncan Bell, Lohmar (DE); Phil Hall, Hingham Norfolk (GB); Rocco Passari, Hurth (DE)

(73) Assignee: Mirus Aircraft Seating Ltd., Norfolk (GB)

( * ) Notice: Subject to any disclaimer, the term of this patent is extended or adjusted under 35 U.S.C. 154(b) by 845 days.

(21) Appl. No.: 16/075,028

(22) PCT Filed: Feb. 11, 2016

(86) PCT No.: PCT/EP2016/052936
§ 371 (c)(1),
(2) Date: Aug. 2, 2018

(87) PCT Pub. No.: WO2016/128524
PCT Pub. Date: Aug. 18, 2016

(65) Prior Publication Data
US 2019/0047710 A1    Feb. 14, 2019

(30) Foreign Application Priority Data
Feb. 11, 2015 (DE) ..................... 10 2015 202 446.6

(51) Int. Cl.
*B64D 11/06* (2006.01)
*B60N 2/68* (2006.01)
(Continued)

(52) U.S. Cl.
CPC ............ *B64D 11/0649* (2014.12); *B60N 2/22* (2013.01); *B60N 2/68* (2013.01); *B60N 2/686* (2013.01);
(Continued)

(58) Field of Classification Search
CPC .. B64D 11/0649; B64D 11/064; B60N 2/753; B60N 2/22; B60N 2/68; B60N 2/686; B60N 3/004; Y02T 50/40
See application file for complete search history.

(56) References Cited

U.S. PATENT DOCUMENTS

| | | | |
|---|---|---|---|
| 2008/0290242 A1* | 11/2008 | Kismarton | B64D 11/0649 248/503.1 |
| 2010/0155536 A1* | 6/2010 | Asami | B64D 11/0649 244/122 R |
| 2012/0048999 A1 | 3/2012 | Schürg et al. | |

FOREIGN PATENT DOCUMENTS

| | | |
|---|---|---|
| WO | 92/05072 A1 | 4/1992 |
| WO | 2014128078 A1 | 8/2014 |

OTHER PUBLICATIONS

PCT International Search Report, Application No. PCT/EP2016/052936, dated May 4, 2016.
PCT Written Opinion, PCT/EP2016/052936, dated May 4, 2016.

* cited by examiner

*Primary Examiner* — Rodney A Bonnette
(74) *Attorney, Agent, or Firm* — MacMillan, Sobanski & Todd, LLC

(57) ABSTRACT

The present invention relates to a lightweight aircraft passenger seat assembly (1), comprising: at least one seat shell (2) having a seat pan (21) and a seat back (22) which are rigidly connected with each other. For offering more comfort to the passengers while still providing the advantages of a minimalistic lightweight design, the lightweight aircraft passenger seat assembly (1) according to the invention further comprises a backrest portion (3) which is movable in relation to the seat shell (2).

14 Claims, 8 Drawing Sheets

(51) Int. Cl.
  *B60N 3/00* (2006.01)
  *B60N 2/22* (2006.01)
  *B60N 2/75* (2018.01)
(52) U.S. Cl.
  CPC ............. *B60N 2/753* (2018.02); *B60N 3/004* (2013.01); *B64D 11/064* (2014.12); *Y02T 50/40* (2013.01)

LIGHTWEIGHT AIRCRAFT PASSENGER SEAT ASSEMBLY

The invention relates to a lightweight aircraft passenger seat assembly comprising at least one seat shell having a seat pan and a seat back which are rigidly connected with each other.

A lightweight aircraft passenger seat assembly of the above type is known from the document WO 2014/128078 A1.

This known lightweight aircraft passenger seat assembly provides a minimalistic design with a reduced set of amenities in order to achieve the lowest possible weight.

For offering more comfort to the passengers while keeping most of the advantages of a rather minimalistic lightweight design, the invention provides a lightweight aircraft passenger seat assembly comprising at least one seat shell having a seat pan and seat back which are rigidly connected with each other, wherein the lightweight aircraft passenger seat assembly further comprises a backrest portion which is movable in relation to the seat shell.

While the seat shell maintains its structural integrity and inherent stiffness due to the rigid connection between the seat pan and the seat back, the movable backrest portion accommodates the passengers' demand for more comfort and allows individual adjustment into the most convenient position, in particular after takeoff and before landing. Another advantage of the inventive lightweight aircraft passenger seat assembly is that the rigid seat shell provides a physical barrier to the passenger behind. Therefore, the backrest portion cannot intrude into the privacy space of the passenger behind, not even in a reclined state. Another advantage is that a tray table attached to the seat shell is decoupled from the movement of the backrest portion. This reduces the risk that any goods positioned on the tray table are dropped from the tray table.

Preferred embodiments are claimed in the sub-claims:

According to an embodiment of the invention, the seat shell comprises at least one of the following features:

The seat shell is composed of at least two components, preferably by bonding. Preferably at least two of the components are combined to form at least one tube portion and/or to sandwich at least one part of another one of the components. Preferably, first and second components of the seat pan are combined to form at least one tube portion and/or to sandwich a part of the seat back. This embodiment is preferable in terms of structural integrity of the seat shell as it eliminates potential weaknesses.

The seat shell defines a receptacle for receiving a cushion portion and/or the backrest portion at least in the stowed position of the backrest portion.

The seat shell or its components is/are made from fiber reinforced composite material. Fiber reinforced composite materials provide maximum strength at minimum weight. Even complex shapes can be formed from fiber reinforced composite materials.

The seat shell or its components comprise(s) at least one fiber layer, which continuously extends fully or partially over the seat pan and/or fully or partially over the seat back.

The seat shell or its components comprise(s) at least two adjacent fiber layers oriented at different angles with respect to each other.

The seat pan and seat back of the seat shell are angled with respect to each other in order to define a space for the passenger to be seated. The angle defined between seat pan and seat back is preferably an obtuse angle, more preferably an obtuse angle in the range between 90° and 120°.

The seat shell comprises at least one tube portion which is configured to receive and/or slide on a supporting portion, preferably on a cross beam of a supporting portion. The tube portion is preferably provided at the seat pan, preferably at a bottom side of the seat pan facing away from the seat back. The tube portion preferably has two open ends, so that the cross beam of the supporting portion can fully extend into or through the tube portion. In order to reduce friction between the tube portion and the cross beam, the tube portion may contact the cross beam only partially around its circumference. Therefore, the cross beam may contain at least one rib for reducing the contact area and the frictional forces, respectively, between the tube portion and the cross beam.

The seat shell comprises two parallel tube portions which are configured to receive and/or slide on two parallel cross beams of a supporting portion, respectively. This configuration allows the seat shell to be moved slidingly along the two cross beams. The two parallel tube portions are preferably provided at the seat pan, preferably at a side of the seat pan facing away from the seat back.

The seat shell comprises at least one opening, preferably two openings, into which the backrest portion extends at least partially in order to engage with a supporting portion of the lightweight aircraft passenger seat assembly.

According to an embodiment of the invention, the seat pan comprises at least one of the following features:

The seat pan comprises a platform portion, wherein the platform portion preferably comprises a flat or substantially flat top surface configured to receive a seat cushion. The platform portion is preferably formed from fiber reinforced composite material. The platform portion preferably comprises a skirt portion at a distal end thereof, wherein the skirt portion preferably extends downwards in a direction facing away from the seat back. The skirt portion preferably defines or covers at least a part of the fore tube portion of the seat shell. This skirt portion preferably provides a physical barrier for avoiding any interference of the passenger's legs with a supporting portion underneath.

The seat pan comprises a bottom portion, wherein the bottom portion is combined with the platform portion so as to form at least one tube portion, preferably two parallel tube portions. The bottom portion is preferably formed from fiber reinforced composite material. The bottom portion preferably defines a cavity forming at least a part of the at least one tube portion, preferably two cavities forming parts of the two parallel tube portions, respectively. The bottom portion preferably comprises a central opening.

The seat pan is cushioned, preferably at its front and/or top surface. The seat pan cushioned that way is more convenient for the passenger.

The seat pan is concavely shaped and/or has a flat shape at its front and/or top surface. The concave shape is adapted to the passenger's anatomy and further improves the convenience for the passenger.

The seat pan is concavely shaped at its bottom surface. This shape may increase the space underneath the seat shell to be used for storage of luggage and as a leg space for the passenger behind.

According to still another embodiment of the invention, the seat back comprises at least one of the following features:

The seat back defines a receptacle for receiving a cushion portion and/or the backrest portion at least in the stowed position of the backrest portion.

The seat back is cushioned, preferably at its front side.

The seat back comprises a rear wall and a frame extending at least partially around the rear wall. The frame is preferably integrally formed with the rear wall, e.g. from fiber reinforced composite material. The frame preferably extends along the longitudinal edges as well as the distal end of the rear wall, so as to project from the outer contour of the rear wall to the front side. More preferably, the frame extends continuously from the seat pan up along one longitudinal edge of the rear wall, along the distal end of the rear wall and down the other longitudinal edge of the rear wall to the seat pan. Even more preferably, the frame has an inverted U-shape, wherein the opening of the U-shape is oriented downwards.

The seat back comprises a tubular section, which preferably extends along at least a part of the outer contour of the seat back, more preferably along at least one of the longitudinal edges and/or the distal edge of the rear wall. The tube portion is preferably defined by the rear wall, the frame and at least one insert connecting the rear wall with the frame. The insert may be L-shaped in cross-section and combined with the rear wall and the frame so as to form the tubular section. The front side or leg of the insert is preferably cushioned. This configuration provides the seat shell with excellent stiffness in combination with minimum weight. Due to its edge strength, the seat shell comprising the tubular section is predestinated for attaching additional devices such as the armrest.

The seat back is concavely shaped at its front side. This shape is adapted to the passenger's anatomy and provides additional comfort.

The seat back is convexly shaped and/or has a flat shape at its rear side. This shape is aesthetically pleasing and provides a physical barrier to the privacy space of the passenger behind.

According to another embodiment of the invention, the backrest portion comprises at least one of the following features:

The backrest portion comprises at least one hinge portion, preferably two hinge portions.

The backrest portion is configured to be moved within the (angular) space defined between the seat back and the seat pan.

The backrest portion is configured to be moved between a stowed position and at least one deployed position. In the stowed position, the backrest portion preferably extends in parallel and/or is in contact with the seat back, in particular with the rear wall of the seat back. This is a preferred in-flight position after takeoff and before landing. In the deployed position, the backrest portion is preferably at least partially spaced from the seat back, in particular with respect to the rear wall of the seat back. This is a preferred takeoff and landing position.

The backrest portion is configured to be inclined with respect to the seat pan and/or the seat back. The angle between the backrest portion and the seat back, in particular the rear wall of the seat back, is preferably in the range between 0° (stowed position) and 20° (most deployed position).

The backrest portion is configured to be moved in parallel or substantially in parallel with the seat back and/or the seat pan, preferably in a direction extending along the seat back (up-down-direction or top-bottom-direction) and/or in a direction across the seat back (left-right-direction).

The backrest portion is configured to be locked in at least two different positions in relation to the seat shell, preferably in any deliberate position.

The backrest portion is hinged, preferably to the seat shell or to a supporting portion of the lightweight aircraft passenger seat assembly, more preferably to a cross beam of the supporting portion, and even more preferably to the aft cross beam of the supporting portion. The backrest portion is preferably hinged to a position which is identical to or at least close to the boundary between the seat pan and the seat back.

The backrest portion, preferably the at least one hinge portion thereof, extends into and/or penetrates the seat shell, in particular for being hinged to the supporting portion. Preferably, the backrest portion comprises two hinge portions extending through openings provided in the seat shell.

The backrest portion comprises a substantially rigid structural component, wherein the rigid structural component is preferably a panel, preferably made from metal and/or a fiber reinforced composite material.

The backrest portion is cushioned at its front side. The cushion is preferably made from leather-coated molded foam.

The backrest portion extends over 50 to 100%, preferably 60 to 80% of the length and/or width of the seat back. The length of the seat back is measured along the seat back, preferably from the lower edge facing the seat pan toward the upper and distal end of the seat back. The width of the seat back is measured across the seat back, preferably along the lower edge facing the seat pan.

The backrest portion extends over 25 to 100% of the area of the front surface of the seat back.

The backrest portion is spring-loaded, preferably towards a deployed position. The backrest portion can be brought into the stowed position by manually urging the backrest portion against the spring force.

According to still another embodiment of the invention, the lightweight aircraft passenger seat assembly comprises a supporting portion for supporting the at least one seat shell and/or the backrest portion relative to an aircraft structure. The supporting portion preferably comprises at least one of the following features:

The supporting portion has at least one cross beam, preferably two cross beams, preferably one fore cross beam and one aft cross beam extending in parallel with each other. The at least one cross beam is preferably made from metal, more preferably aluminum. The at least one cross beam preferably has a constant circular outer diameter. The at least one seat shell and/or the backrest portion is/are preferably attached to the at least one cross beam, in particular the aft cross beam.

The supporting portion has at least one leg portion for attaching the at least one cross beam to the aircraft structure. The at least one leg portion is preferably made from metal, more preferably aluminum. The at least one leg portion may comprise a fore leg, an aft leg, a longitudinal tie bar and a diagonal tie bar. The at least one leg portion is preferably made from metal, more preferably aluminum.

According to still another embodiment of the invention, the lightweight aircraft passenger seat assembly comprises a cushion portion. The cushion portion preferably comprises at least one of the following features:

- The cushion portion is at least partially fitted into the seat shell, preferably into the seat pan and/or into the seat back.
- The cushion portion defines a receptacle for receiving the backrest portion partially or fully at least in the stowed position of the backrest portion. The receptacle defined by the cushion portion is preferably entirely filled with the backrest portion in the stowed position.
- A surface of the cushion portion is flush with an adjacent surface of the backrest portion at least in the stowed position of the backrest portion. Preferably, the front surface(s) of the cushion portion located laterally and/or above the backrest portion is/are flush with the front surface of the backrest portion at least in the stowed position of the backrest portion. Preferably, the front surface of the backrest portion projects beyond the front surface of the cushion portion in the deployed position.
- The cushion portion comprises a headrest portion. The headrest portion is preferably located at the top end of the seat back right above the backrest portion at least in the stowed position of the backrest portion. The headrest portion preferably incorporates wings or ears configured to come around the side of the head to provide the passenger with an additional feel of privacy.
- The cushion portion comprises at least one lateral portion, more preferably two lateral portions, which are preferably arranged at opposite lateral sides of the backrest portion in the stowed state.
- The cushion portion comprises at least one sitting portion positioned on top of the seat pan. The sitting portion is preferably configured to receive and discharge most of the weight of the seated passenger to the supporting portion underneath.
- The cushion portion comprises at least one skirt portion positioned in front of (the skirt portion of) the seat pan.
- The cushion portion is combined from separate pieces to form an integrated piece.

According to still another embodiment of the invention, the lightweight aircraft passenger seat assembly has at least one armrest. The armrest may have at least one of the following features:

- The armrest is attached to the seat shell, preferably to the seat back.
- The armrest is hinged to the seat shell, preferably to the frame of the seat back.
- The armrest has a fixture, a resting portion and an actuator.

According to still another embodiment of the invention, the lightweight aircraft passenger seat assembly further comprises a lock mechanism which is configured to lock the backrest portion in relation to the seat shell, wherein the lock mechanism is configured to be unlocked upon actuation of an actuator such that the backrest portion can be moved in relation to the seat shell, wherein the actuator is preferably embodied as a lever and/or located at the distal end of an armrest.

According to still another embodiment of the invention, the lightweight aircraft passenger seat assembly comprises a tray table assembly to be used by a passenger seated behind the seat shell. The tray table assembly preferably has at least one of the following features:

- The tray table assembly is attached to the seat shell, preferably to the seat back of the seat shell.
- The tray table assembly comprises a tray table and a guide mechanism for guiding the tray table between a stowed and at least one deployed position. The guide mechanism preferably comprises a guide groove for guiding at least one guide pin projecting from the tray table into at least two resting positions corresponding to the stowed position and/or the at least one deployed position. Preferably, the guide mechanism comprises two opposed guide grooves for guiding two guide pins projecting from opposite sides of the tray table simultaneously. Preferably, the tray table has to be manually operated, e.g. lifted, in order to disengage the guide pin(s) from a resting position.
- The tray table extends in parallel and in contact with a rear wall of the seat back in the stowed position.
- The tray table extends in an angled state relative to the rear wall of the seat back contacting the same at the at least one deployed position.
- The tray table is held in contact with the rear wall of the seat back through magnetic force in the stowed and/or in the at least one deployed position. Therefore, either one of the rear wall of the seat back or the tray table can be at least partially made from magnetic material, or contain such a magnetic material.
- The tray table engages with an engagement feature provided at the rear wall of the seat back in the stowed and/or in the at least one deployed position. The engagement feature can be a groove, which is configured to receive an edge of the tray table. If the edge of the tray table is engaged with the engagement feature, the tray table is preferably locked in position, both in terms of translatory and rotary movement.
- The tray table can be guided into at least two deployed positions, which are shifted along the seat back (up-down-direction or top-bottom-direction). One of the deployed positions of the tray table might be convenient for eating ("eat"-position), another one of the deployed positions may be convenient for operating and/or enjoying personal entertainment devices such as laptops, tablet computers and the like ("play"-position).

It can prove advantageous if the at least one seatbelt fixture is attached to or formed by at least one leg portion and/or at least one cross beam of the supporting portion. In this case, so-called "spreaders" or "spreader arms" are dispensable, which further reduces the weight of the lightweight aircraft passenger seat assembly.

Another preferred aspect of the invention relates to a method for manufacturing a lightweight aircraft passenger seat assembly according to one of the preceding embodiments, comprising the following steps:

- Fitting the backrest portion and the seat shell onto a cross beam of a supporting structure, so that the cross beam extends through the seat shell and the backrest portion; and
- Sliding the backrest portion and the seat shell along said cross beam into a predetermined position; and
- Clamping said backrest portion and/or said seat shell to said cross beam.

More specifically, a preferred method for manufacturing a lightweight aircraft passenger seat assembly embodied as a "triple" and furnished with three passenger seats comprises the following steps:

- Providing three seats, each seat by fitting a backrest portion into a corresponding seat shell, so that a hinge portion of the backrest portion extends into an aft tube portion of the seat shell;
- Mounting the center seat onto a supporting portion by inserting fore and aft cross beams into fore and aft tube portions of the seat shell, so that the aft cross beam extends through the aft tube portion of the seat shell as well as the hinge portion of the backrest portion, and the fore cross beam extends through the fore tube portion of the seat shell;
- Sliding the backrest portion and the seat shell of the center seat substantially into their predetermined positions along the two cross beams;
- Fitting two leg portions onto the fore and aft cross beams and sliding the leg portions along the cross beams so as to be arranged at both sides of the center seat;
- Fitting the outer two seats onto the fore and aft cross beams, so that the aft cross beam extends through the aft tube portions of the seat shells as well as the hinge portions of the backrest portions of the outer two seats, and the fore cross beam extends through the fore tube portions of the seat shells of the outer two seats;
- Clamping the center seat and/or the outer two seats in position along the fore and aft cross beams, preferably by attaching end caps onto the fore and aft cross beams.

Further preferred embodiments of the invention result from any possible combination of the features disclosed in the description, drawings and claims.

DETAILED DESCRIPTION OF THE PREFERRED EMBODIMENT

Figure 1:
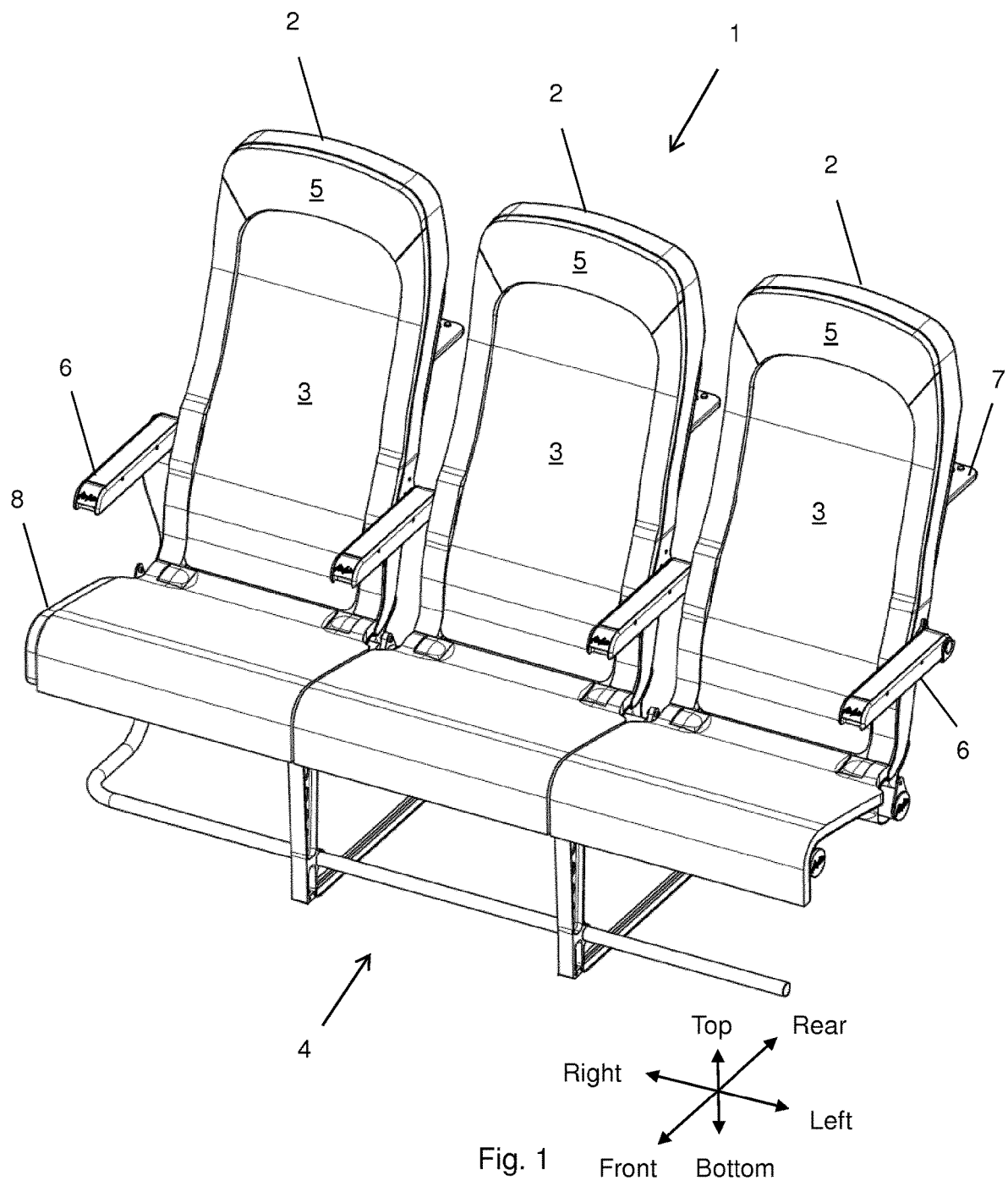
FIG. 1 shows a front side perspective view of a lightweight aircraft passenger seat assembly according to the invention.

The preferred embodiment of a lightweight aircraft passenger seat assembly according to the invention is described in the following in context with the appended drawings. More specifically, the preferred embodiment of the invention is a so-called "triple" comprising three individual seat spaces (PAX), as shown in FIG. 1.

The complete assembly 1 contains three general subassemblies, namely:

- The supporting portion 4, including the leg portions 43, (cross) beams 41, 42 and the baggage (restrain) bar 44. The preferred material of use for the supporting portion 4 and its components is metal, in particular aluminum.
- The three seats, wherein each seat includes a seat shell 2, an inclinable backrest portion 3 and a cushion portion 5. The preferred materials of use for the seats are composite for the structural parts, and leather and/or foam for the cushioned parts of the backrest portion 3 and the cushion portion 5.
- Ancillaries, including end caps 45, armrests 6, tray table assemblies 7, cover 8 and literature pockets 9.

Figure 2:
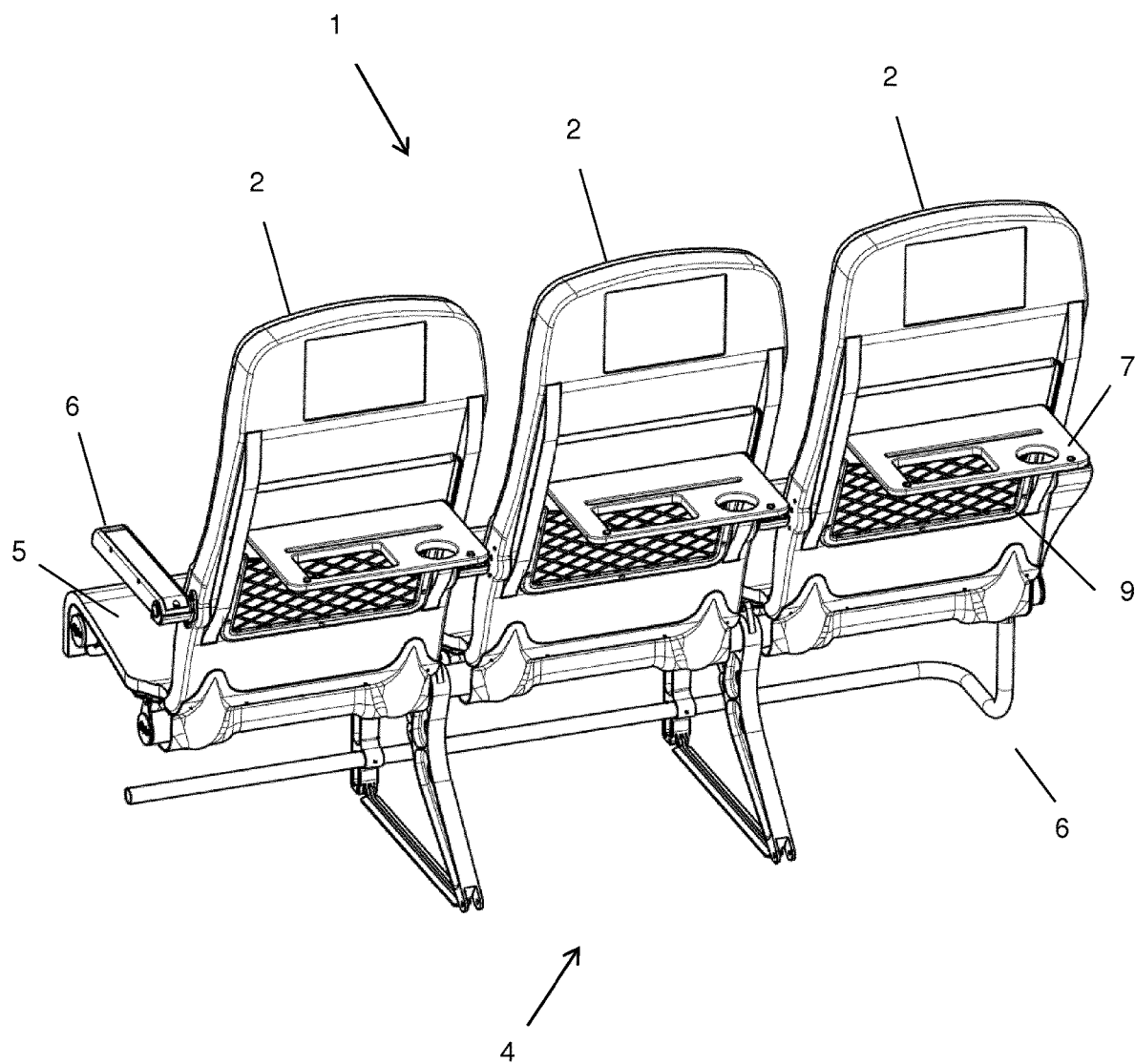
FIG. 2 shows a rear side perspective view of the lightweight aircraft passenger seat assembly according to FIG. 1.
Figure 3:
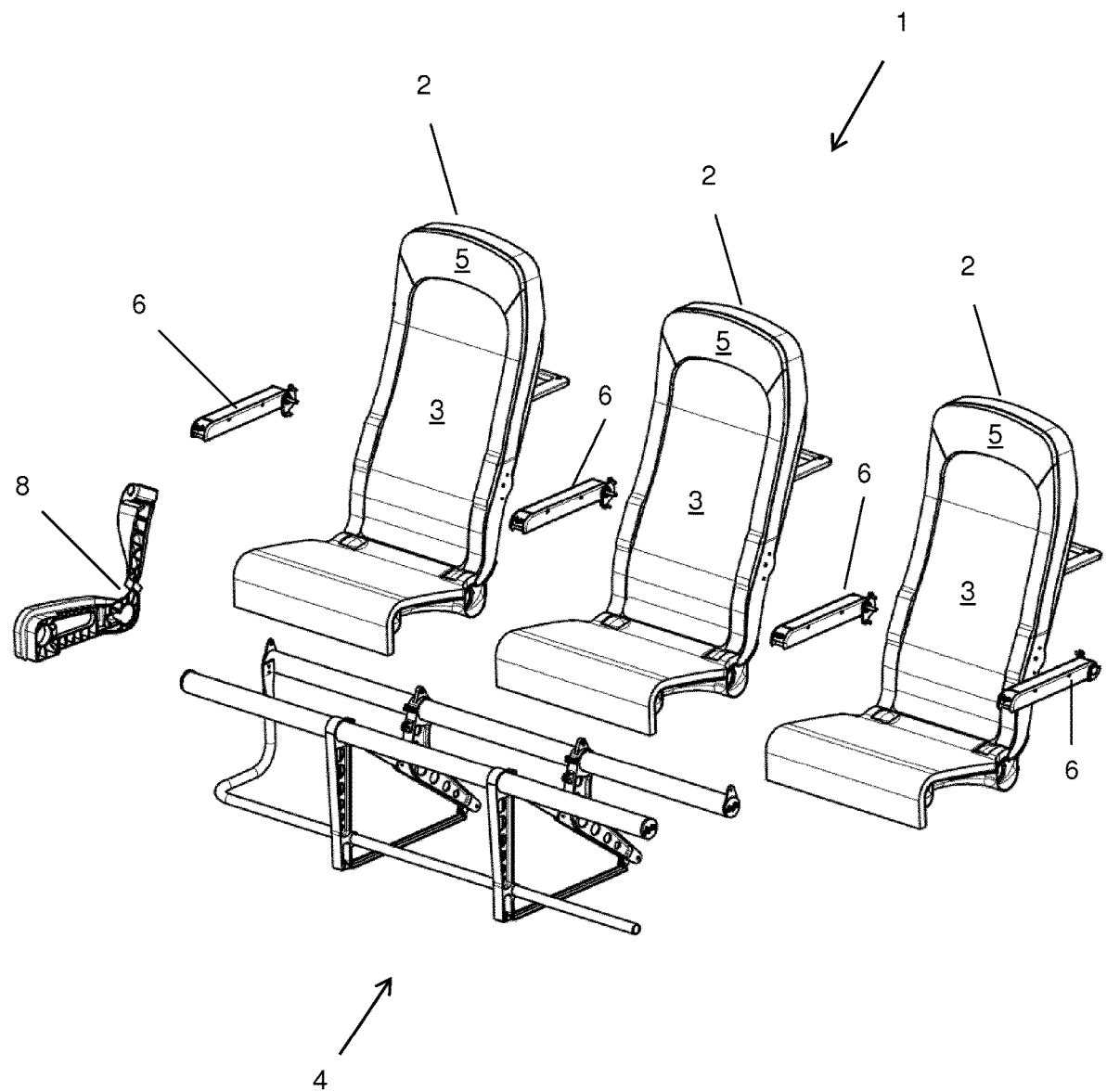
FIG. 3 shows an exploded front side perspective view of the lightweight aircraft passenger seat assembly according to FIG. 1.

As shown in FIGS. 1 to 3, the three seats are supported by the supporting portion 4. Each one of the three seats is composed of one seat shell 2 (see in particular FIG. 6), one backrest portion 3 and one cushion portion 5 (see in particular FIG. 8). One or two armrest portions 6 and a tray table assembly 7 are attached to each seat shell 2. Seatbelt fixtures are also provided, but not explicitly shown in the drawings.

Supporting Portion 4

Figure 4:
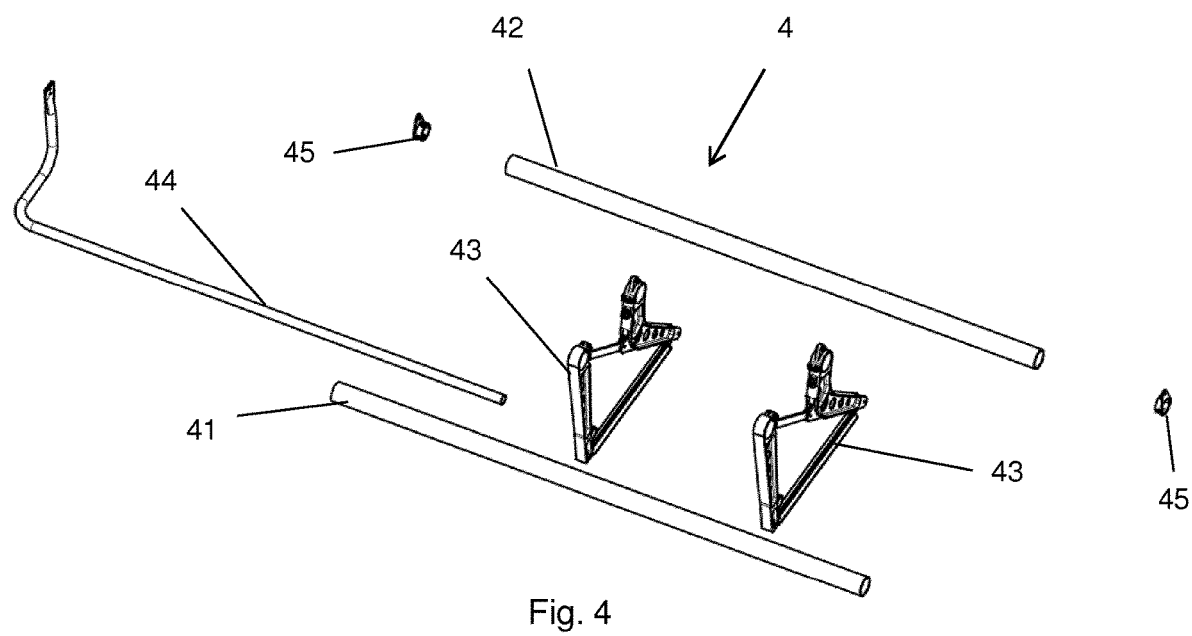
FIG. 4 shows an exploded front side perspective view of a supporting portion of the lightweight aircraft passenger seat assembly according to FIG. 1.
Figure 5:
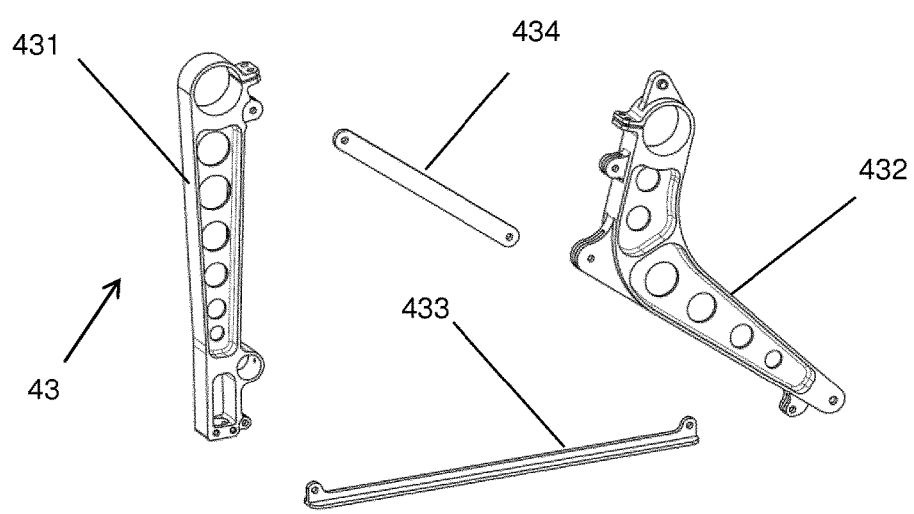
FIG. 5 shows an exploded front side perspective view of a leg portion of the supporting portion according to FIG. 4.

As shown particularly in FIGS. 3 to 5, the supporting portion 4 is composed of two aluminum tubular cross beams 41, 42 configured to extend in parallel in the aircraft's widthwise (left-right) direction and two aluminum leg portions 43 for supporting the cross beams 41, 42. A tubular and bent baggage restrain bar 44 is attached to the leg portions 43 and the aft cross beam 42. The open ends of the tubular cross beams 41, 42 are closed by end caps 45. The structural end caps 45 at either extreme of the rear beam 42 carry the outermost seat belt mount.

As shown particularly in FIG. 5, each leg portion 43 has a substantially vertical fore leg 431, an angled aft leg 432, a longitudinal tie bar 433 and a diagonal tie bar 434. The fore leg 431 and the aft leg 432 comprise reinforcement ribs and circular cutouts as weight-saving features. Circular eyelets at the upper ends of the fore leg 431 and the aft leg 432 receive and clamp the tubular cross beams 41, 42, as shown in FIG. 3.

The two leg portions 43 including the fore and aft legs 431, 432 connect the triple to the rails supplied and fitted in the air frame. They do so through the use of industry standard anchors which are bolted or threaded into the machined or cast fore and aft leg sections 431, 432.

These rail anchors provide roll condition compliance required during statutory dynamic testing. The aluminum leg sections 43 are bolted together with the two tie bars 433, 434, one longitudinal along the floor/rail at the base and one diagonally joining the mid of the aft leg 432 to the top of the fore leg 431. These tie bars 433, 434 allow a controlled degree of geometric compliance during testing. The aft leg 432 carries the anchor boss for the inner seatbelt mounts, further negating the need for the traditional "spreader" component.

FIG. 3 shows the leg assembly, wherein the legs 43 are mechanically clamped at the top to the two transverse tubular aluminum beams 41, 42, upon which the seats are mounted, and at the lower front to the tubular bent/formed baggage bar 44.

Seat Cassette (including seat shell 2, backrest portion 3 and cushion portion 5).

The passenger seating component of the assembly 1 is made up of a composite cassette (also referred to as seat shell 2), a recline pad mechanism assembly (also referred to as backrest portion 3) and the remaining cushioning for the pan, sides and head area (also referred to as cushion portion 5).

The cassette is a composite three piece molded and bonded assembly. Upper (platform portion 21a) and lower pan (bottom portion 21b) moldings clamp the seat back 22. The whole cassette is then slid transversely over the fore and aft beams 41, 42 during assembly.

The recline structure (backrest portion 3) is clamped to and rotates around the rear beam 42. Activated by either a mechanical or a hydro-mechanical lock mechanism via a lever 63 on the passenger armrest 6, it sits proud of the remaining cushioning (cushion portion 5) during take off and landing and flush with the remaining cushioning (cushion portion 5) in its reclined state. Only the centre recline section (backrest portion 3) articulates within the cassette (seat shell 2) and remaining cushioning (backrest portion 3) causing no interference with the living space of the passenger behind.

The surround cushioning (headrest portion 51 and lateral portions 52 of the cushion portion 5) and pan cushioning (sitting portion 53 and skirt portion 54 of the cushion portion 5) is leather covered contoured multipart foam. The foam structure is mounted to a carrier frame structure in molded plastic or composite which in turn is mounted to the cassette.

Seat Shell 2

As briefly discussed above and particularly shown in FIG. 6, the seat shell 2 is composed of three separate fiber reinforced composite components, namely of a composite platform portion 21a and a composite bottom portion 21b of the seat pan 21 sandwiching the lower end of the composite seat back 22. These three separate composite components 21a, 21b, 22 are combined by bonding.

Figure 8:
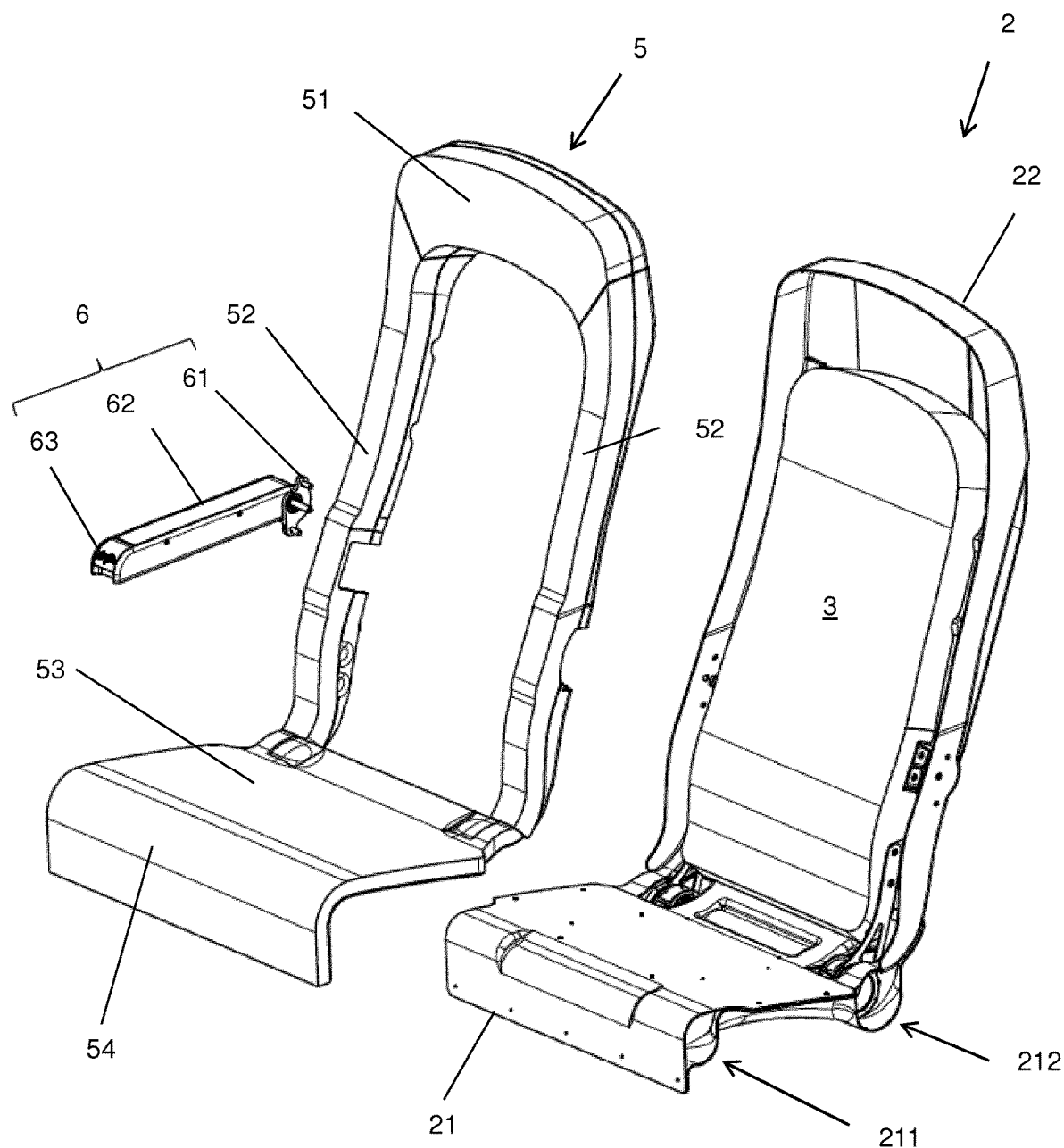
FIG. 8 shows an exploded front side perspective view of a seat of the lightweight aircraft passenger seat assembly according to FIG. 1, wherein the backrest portion according to FIG. 7 is assembled and combined with the assembled seat shell according to FIG. 6, wherein a cushion portion and an armrest portion of the lightweight aircraft passenger seat assembly according to FIG. 1 are separately shown.
Figure 9:
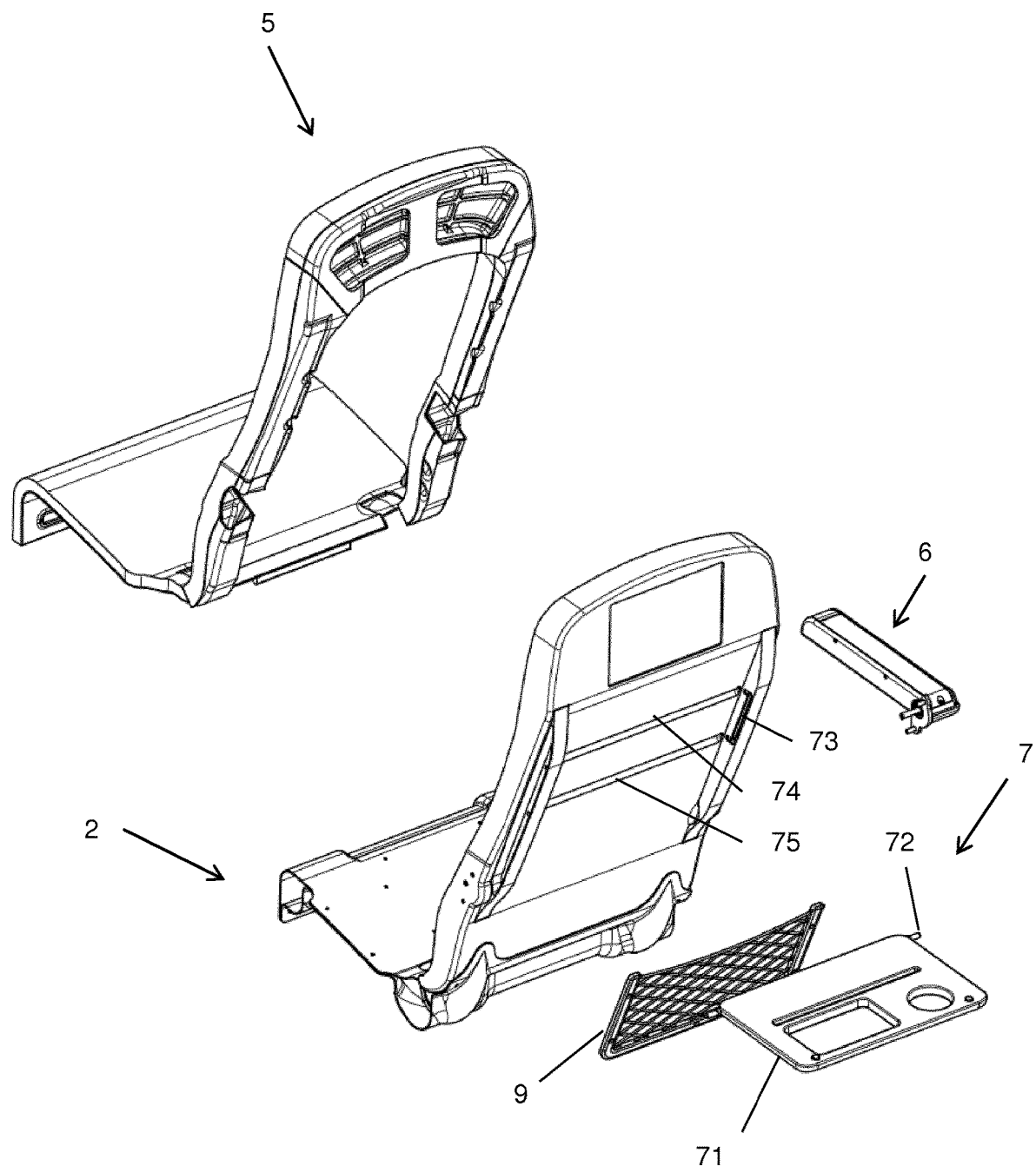
FIG. 9 shows an exploded rear side perspective view of a seat of the lightweight aircraft passenger seat assembly according to FIG. 8.

The platform portion 21a of the seat pan 21 has a substantially flat top surface 210 and is configured to receive a sitting portion 53 of a cushion portion 5 (see FIG. 8). A skirt portion 213 extending downwards and away from the seat back 22 is provided at a distal end of the platform portion 21a so as to define and cover a fore tube portion 211 of the seat shell 2. This skirt portion 213 serves as a physical barrier for preventing an intrusion of the passenger's legs into the space underneath the seat shell 2. The skirt portion 213 is cushioned by a skirt portion 54 of the cushion portion 5. Two openings or cutouts 214 provided in the rear part of the platform portion 21a adjacent to the seat back 22 are configured to receive hinge portions 33 of the backrest portion 3, as shown and explained in greater detail below in context with FIG. 8.

The bottom portion 21b of the seat pan 21 defines a central opening and two cavities, and is configured to be combined with the platform portion 21a of the seat pan 21 so as to form two parallel tube portions 211, 212 with slightly greater diameters compared to the fore and aft cross beams 41, 42 of the supporting portion 4. The bottom portion 21b is concavely shaped at its bottom side facing away from the seat back 22, so as to increase the available space underneath the seat shell 2. The space underneath the seat shell 2 may be used as baggage storage space or just as leg space for the passenger behind.

The two parallel tube portions 211, 212 defined between the platform portion 21a and the bottom portion 21b of the seat pan 21 are configured to receive and encircle the fore and aft cross-beams 41, 42 of the supporting portion 4. The dimensions of the parallel tube portions 211, 212 are such that the seat shell 2 can slide on the cross-beams 41, 42.

Figure 6:
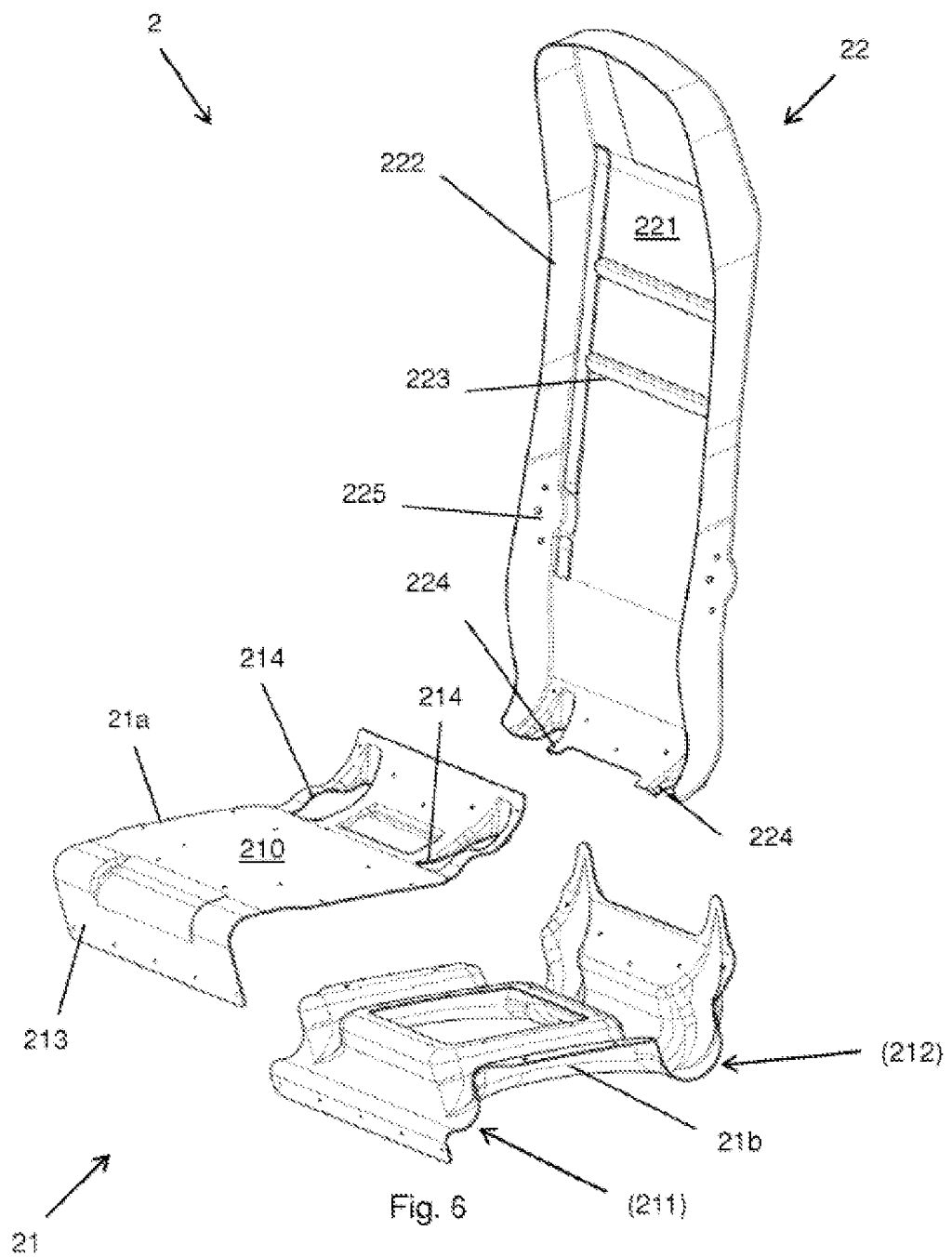
FIG. 6 shows an exploded front side perspective view of a seat shell of the lightweight aircraft passenger seat assembly according to FIG. 1.

As shown particularly in FIG. 6, the seat back 22 is concavely shaped at its front side defining a cavity by means of a rear wall 221 and a frame 222 extending around the rear wall 221. The frame 222 is integrally formed with the rear wall 221 from fiber reinforced composite material and projects from the outer contour of the rear wall 221 to the front. More particularly, the frame 222 extends in an inverted U-shape continuously up along the entire longitudinal edges of the rear wall 221 to join at the distal end of the rear wall 221. Reinforcement ribs 223 extending in up-down directions as well as in left-right directions orthogonal to the up-down are provided at the front side of the rear wall 221 in order to increase stiffness and mechanical strength of the seat back 22. Two cutouts 224 are provided at the lower edge of the seat back 22 to be at least partially overlapped with the openings 214 provided in the platform portion 21a of the seat pan 21.

Even though not shown in the drawings, the seat back 22 preferably comprises a tubular section defined by the rear wall 221, the frame 222 and L-shaped inserts connecting the rear wall 221 with the frame 222. The tubular section preferably extends along the outer contour of the rear wall 221, wherein the inserts significantly increase the edge strength of the seat back 22. Attachment portions 225 designated for the attachment of armrest portions 6 are provided at the frame 222 at both sides of the seat back 22.

Backrest Portion 3

Figure 7:
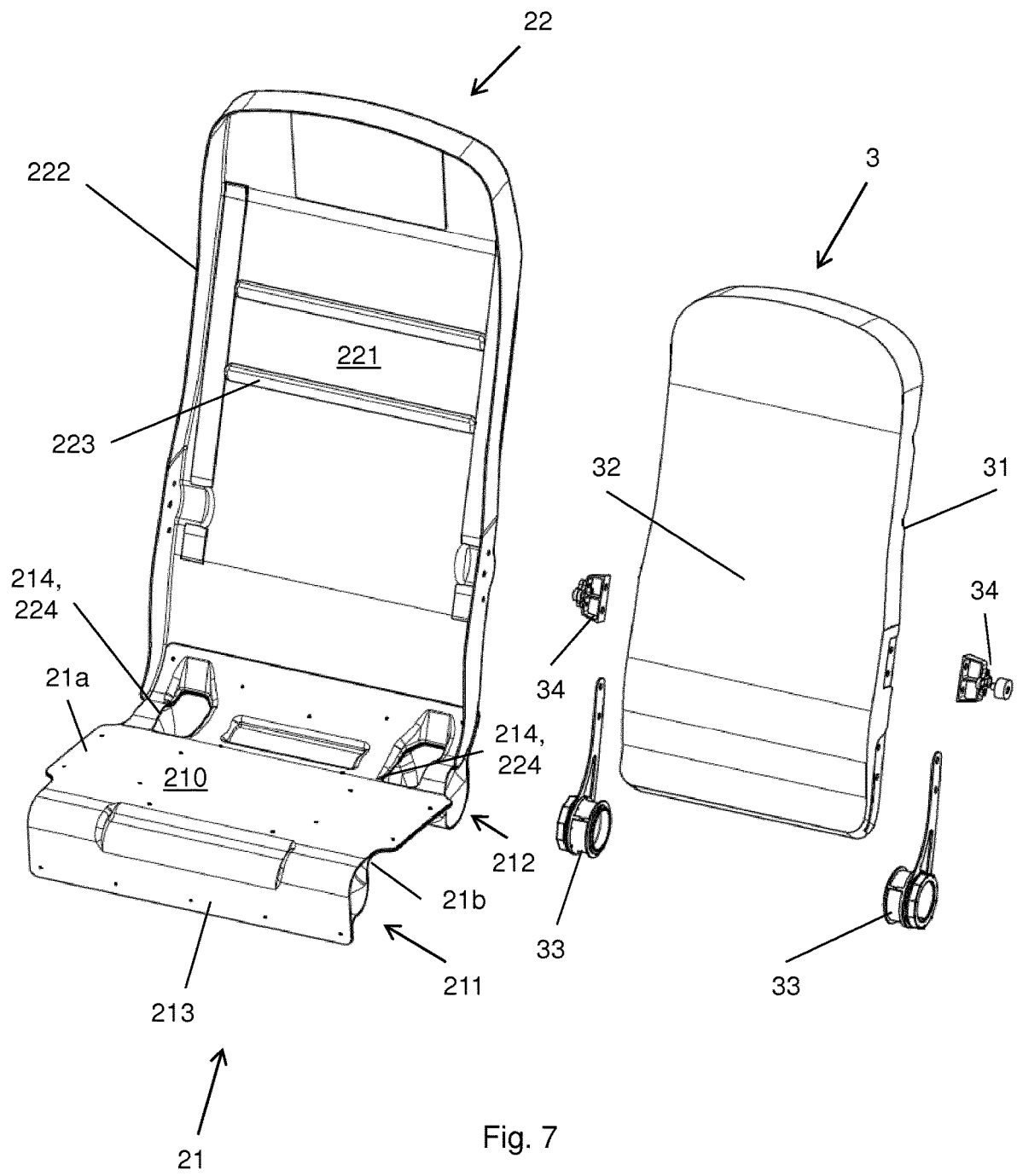
FIG. 7 shows a front side perspective view of the seat shell according to FIG. 6 in an assembled state (left) next to an exploded front side perspective view of the backrest portion of the lightweight aircraft passenger seat assembly according to FIG. 1 (right).

As shown particularly in FIG. 7, the backrest portion 3 comprises a substantially rectangular panel 31 made from fiber reinforced composite material. The panel 31 is a structural part and cushioned at its front side preferably with a leather-coated soft cellular foam material 32. Hinge portions 33 are attached to the lower longitudinal edges of the panel 31 by means of fixtures 34. The hinge portions 33 comprise engagement arms providing several engagement positions for engagement of the fixtures 34 with the panel 31.

The hinge portions 33 of the backrest portion 3 are configured to extend into the aft tube portion 212 of the seat shell 2 through the openings 214 of the platform portion 21a and the cutouts 224 of the seat back 22 so as to hinge to the aft cross-beam 42 of the supporting portion 4. In the assembled state shown in FIG. 1, the backrest portion 3 is inclinable relative to the seat shell 2 between a stowed position and a fully deployed position. In the stowed position, the backrest portion 3 is fully received in the cavity defined by the cushion portion 5, and the front surface of the backrest portion 3 is flush with the surrounding front surface of the cushion portion 5. In the fully deployed position, the backrest portion 3 is inclined by e.g. 20° to the front in relation to the rear wall 221 of the seat back 22, and the distal/upper end of the backrest portion 3 projects from the cavity defined by the cushion portion 5.

The backrest portion 3 is spring-loaded towards the fully deployed position. The spring is preferably provided between the panel 31 of the backrest portion 3 and the rear wall 221 of the seat back 22 of the seat shell 2. A locking mechanism (not shown) locks the backrest portion 3 in any position relative to the seat shell 2, including the stowed position or any deployed position. The locking mechanism can be unlocked by means of an actuator 63. In this embodiment, the actuator 63 is a lever provided at the distal end of the armrest portion 6 attached to the seat shell 2.

Cushion Portion 5

The cushion portion 5 is composed of a headrest portion 51, two lateral portions 52, a sitting portion 53 and a skirt portion 54. The upper part of the cushion portion 5 is fitted into the cavity defined by the frame 222 and the rear wall 221 of the seat back 22, so that the headrest portion 51 and the two lateral portions 52 extend along the frame 222 of the seat back 22 at the inner side thereof. A head cushion (not shown) is attached via velcro to the headrest portion 51 to provide additional comfort to those who request it. The headrest portion 51 also incorporates wings or ears coming around the side of the head to provide the passenger with an additional feel of privacy. As shown in FIG. 1, the front surfaces of the cushion portion 5 and the backrest portion 3 are flush in the stowed position of the backrest portion 3.

Armrest Portion 6

The armrests 6 are fitted to only the seat shells 2, as the traditional hanger is not present.

The armrest portion 6, as shown in FIGS. 1 to 3, 8 and 9, is composed of a fixture 61 on one end of a resting portion 62 and an actuator/lever 63 for unlocking the locking mechanism of the backrest portion 3 at the other (distal) end of the resting portion 62. The fixture 61 is configured to be attached to the attachment portion 225 of a seat shell 2 and comprises a bolt, to which the resting portion 62 is hinged. Different versions of the armrest portion 6 are available, one for attachment to the right side of the seat shell 2 and another one for attachment to the left side of the seat shell 2. Two armrest portions 6 are attached to the seat shell 2 of one of the seats, which may be the center seat or one of the outer seats. The actuator 63 is embodied as a lever and located at the distal end of the armrest portion 62 to be flush with adjacent surfaces. Since the backrest portion 3 is spring-loaded, the spring force urges the backrest portion 3 into a (further) deployed position upon actuation of the actuator 63. In the unlocked state, the backrest portion 3 can be manually urged against the spring-force back into the stowed position.

Tray Table Assembly 7

A tray table assembly 7 is mounted to the rear wall 221 of the seat back 22 of each seat shell 2 in order to be operated by a passenger behind. The tray table assembly 7 comprises a tray table 71 with guide pins 72 projecting from opposite sides of the tray table 71 to be guided in opposing guide grooves 73, so as to move the tray table 71 between a stowed and two different deployed positions.

In the stowed position, the tray table 71 extends in parallel with the rear wall 221 of the seat back 22 and contacts same, wherein the tray table 71 is held in contact with the rear wall 221 of the seat back 22 through magnetic force.

To transfer the tray table 71 from the stowed position into one of the upper and lower deployed positions, the rear (trailing) edge of the tray table 71 has to be pulled downwards to move the tray table 71 by sliding the guide pins 72 along the guide grooves 73 into a respective upper or lower resting position while engaging the leading edge of the tray table 71 with a respective one of upper and lower engagement grooves 74, 75.

In the upper deployed position, the tray table 71 extends in an angled position relative to the rear wall 221 of the seat back 22, wherein the front (leading) edge of the tray table 71 engages with the upper engagement groove 74 and the engagement pins 72 rest in the upper resting positions of the guide grooves 73. Thereby, the tray table 71 is locked in position and prevented from any translatory or rotational movement. The upper deployed position of the tray table 71 is convenient for operating and/or enjoying personal entertainment devices such as laptops, tablet computers and the like, and is also referred to as "play" position.

In the lower deployed position, the tray table 71 extends in an angled position relative to the rear wall 221 of the seat back 21, preferably at the same angle as in the upper deployed position, wherein the leading (front) edge of the tray table 71 engages with the lower engagement groove 75 and the engagement pins 72 rest in the lower resting positions of the guide grooves 73. In the lower deployed position, the tray table 71 is also locked in position and prevented from any translatory or rotational movement. The lower deployed position of the tray table 71 is convenient for eating and is also referred to as "eat" position.

To transfer the tray table 71 from any one of the upper or lower deployed positions to the stowed position, the user has to lift the trailing edge of the tray table 71 and to disengage the guide pins 72 from the upper or lower resting positions of the guide grooves 73, thus tilting the top surface of the tray table 71 to face the rear wall 221 of the seat back 22 until the top surface of the tray table 71 fully contacts the rear wall 221 of the seat back 22 and is held in contact with the rear wall 221 of the seat back 22 by magnetic force.

In summary, the tray table 71 on the rear of the cassette offers two slotted deployed positions and one take-off and landing position. One slotted position for eating or working at the usual height and one for tablet or device viewing allowing leisure such as games or movies to be enjoyed. A grooved guide 73 allows the locking of either position. The tray 71 also contains specifically sized recesses for the airline's meal container and drink.

An elasticized net pocket 9 is designed to hold in-flight brochures and safety literature.

Cover 8

The end cap or cover 8 on the aisle-side of the triple carries the crew step to reach overhead bins (see FIG. 2) and closes out the fore and aft beams 41, 42 both structurally to prevent trolley damage in the aisle and cosmetically. The cover 8 is preferably made by injection-molding from plastic, e.g. ABS.

REFERENCE NUMERALS

1: Seat assembly
2: Seat shell
21: Seat pan
21a: Platform portion
21b: Bottom portion
210: Top surface
211: Tube portion (fore)
212: Tube portion (aft)
213: Skirt portion
214: Opening
22: Seat back
221: Rear wall
222: Frame
223: Rib(s)
224: Cut-out
225: Attachment portion
3: Backrest portion
31: Panel 32: Foam material
33: Hinge(s)
34: Fixture
4: Supporting portion
41: Fore cross beam
42: Aft cross beam
43: Leg portion(s)
431: Fore leg
432: Aft leg
433: Longitudinal tie bar
434: Diagonal tie bar
44: Baggage bar
45: End caps
5: Cushion portion
51: Headrest portion
52: Lateral portion
53: Sitting portion
54: Skirt portion
6: Armrest portion
61: Fixture
62: Resting surface
63: Actuator/lever
7: Tray table assembly
71: Tray table
72: Guide pin(s)
73: Guide mechanism/groove(s)
74: Upper engagement groove
75: Lower engagement groove
8: Cover
9: Literature pocket

The invention claimed is:

1. An aircraft passenger seat assembly comprising:
a seat shell that includes a seat pan and a seat back that are rigidly connected with each other, the seat shell having opposed sides that define a width;
a supporting portion that supports the seat shell and is adapted to be supported relative to an aircraft structure, the supporting portion including a cross beam that extends the width of the seat shell; and
a backrest portion that is hinged to the cross beam of the supporting portion so as to be rotatable about the supporting portion and in relation to the seat shell.

2. The aircraft passenger seat assembly defined in claim 1 wherein the seat pan and the seat back are composed of composite components that are bonded together to form the seat shell having a tube portion and/or to sandwich a part of another composite component.

3. The aircraft passenger seat assembly defined in claim 1 wherein the supporting portion has a leg portion that is adapted to attach the cross beam to an aircraft structure.

4. The aircraft passenger seat assembly defined in claim 1 further including a cushion portion that is at least partially fitted into the seat shell and/or defines a receptacle for receiving the backrest portion in a stowed position.

5. The aircraft passenger seat assembly defined in claim 4 wherein a front surface of the backrest portion is flush with an adjacent surface of the cushion portion when located in a stowed position, and wherein the front surface of the backrest portion projects beyond the adjacent surface of the cushion portion when located in a deployed position.

6. The aircraft passenger seat assembly defined in claim 1 wherein an armrest is attached to the seat shell.

7. The aircraft passenger seat assembly defined in claim 1 further including a tray table assembly having a tray table and a guide mechanism for guiding the tray table between a stowed position, wherein preferably the tray table extends parallel to and in contact with a rear wall of the seat back, and a deployed position, wherein the tray table extends at angled relative to the rear wall of the seat back.

8. An aircraft passenger seat assembly comprising:
a supporting portion that is adapted to be supported on a floor of an aircraft, the supporting portion including a cross beam;
a seat shell including a seat pan and a seat back that are rigidly connected with each other, the seat shell being rigidly connected with the supporting portion; and
a backrest portion that extends into the seat shell and is hinged to the cross beam of the supporting portion such that the backrest portion is constrained to rotate about the supporting portion.

9. The aircraft passenger seat assembly defined in claim 8 wherein the seat pan and the seat back are composed of composite components that are bonded together to form the seat shell having a tube portion and/or to sandwich a part of another composite component.

10. The aircraft passenger seat assembly defined in claim 8 wherein the supporting portion has a leg portion that is adapted to attach the cross beam to an aircraft structure.

11. The aircraft passenger seat assembly defined in claim 8 further including a cushion portion that is at least partially fitted into the seat shell and/or defines a receptacle for receiving the backrest portion in a stowed position.

12. The aircraft passenger seat assembly defined in claim 11 wherein a front surface of the backrest portion is flush with an adjacent surface of the cushion portion when located in a stowed position, and wherein the front surface of the backrest portion projects beyond the adjacent surface of the cushion portion when located in a deployed position.

13. The aircraft passenger seat assembly defined in claim 8 wherein an armrest is attached to the seat shell.

14. The aircraft passenger seat assembly defined in claim 8 further including a tray table assembly having a tray table and a guide mechanism for guiding the tray table between a stowed position, wherein preferably the tray table extends parallel to and in contact with a rear wall of the seat back, and a deployed position, wherein the tray table extends at angled relative to the rear wall of the seat back.

* * * * *